United States Patent [19]
Walon

[11] 3,755,294
[45] Aug. 28, 1973

[54] PROCESS FOR THE PRODUCTION OF D-ARABINOSE

[75] Inventor: Raoul Guillaume Philippe Walon, Brussels, Belgium

[73] Assignee: CPC International Inc., Englewood Cliffs, N.J.

[22] Filed: Oct. 26, 1970

[21] Appl. No.: 84,233

[52] U.S. Cl. ............................................. 260/209 R
[51] Int. Cl. ........................................... C07c 69/20
[58] Field of Search ....................... 260/209, 209 R

[56] References Cited
OTHER PUBLICATIONS

Hockett, et al., "Jour. Amer. Chem. Soc.", Vol. 56, 1934, pp. 1632–1633.

Primary Examiner—Lewis Gotts
Assistant Examiner—Johnnie R. Brown
Attorney—Frank E. Robbins, John B. Goodman, Janet E. Price, Joseph Shekleton, Martha A. Michaels and Dorothy R. Thumler

[57] ABSTRACT

This invention discloses a process for the production of arabinose, which comprises reacting calcium gluconate with hydrogen peroxide in the presence of a catalytic amount of ferric gluconate.

4 Claims, No Drawings

PROCESS FOR THE PRODUCTION OF D-ARABINOSE

D-Arabinose, as such, or after oxidation to D-arabonic acid can be used for the production of riboflavin. This use, however, has been limited due to the high cost of arabinose, which results from the lack of a process which is capable of producing D-arabinose in economic yields.

Various procedures for producing D-arabinose are known in the art. One method comprises the well-known Ruff reaction, which produced D-arabinose by the degradation of calcium gluconate with hydrogen peroxide in the presence of ferric acetate. This degradation, while relatively simple, only results in yields of about 25% of theoretical.

Hocket and Hudson developed an improvement of the Ruff reaction (JACS Vol. 56, page 1632; 1934) by utilizing the double decomposition process of ferric sulfate with barium acetate as the catalyst. This improved procedure resulted in yields of D-arabinose ranging from 34 to 40 percent by weight.

Other methods of preparing D-arabinose are shown in the art. For example, the British Pat. 953,012, issued to Sankyo Company Limited, discloses a process for preparing D-arabinose by total synthesis. This procedure, however, requires the preparation of five intermediary reaction products and is, therefore, an excessively lengthy procedure for preparing D-arabinose on a commercial basis.

It has now been found that D-arabinose can be readily prepared in high yields in a one-step reaction. More specifically, it has been found that D-arabinose can be prepared in yields of about 60% of theoretical by the decarboxylation of calcium gluconate.

In its broadest scope, the present invention comprises a process for the production of D-arabinose which comprises reacting calcium gluconate with hydrogen peroxide in the presence of a catalytic amount of ferric gluconate. Unexpectedly, the use of ferric gluconate in the degradation of calcium gluconate with hydrogen peroxide results in yields as high as 60 percent. This yield represents a significant increase over yields obtained by the procedures in the prior art, and results in a process whereby D-arabinose can be conveniently prepared on a commercial scale.

The process of this invention can be effected by the controlled addition of hydrogen peroxide to a solution of calcium gluconate in an aqueous system in the presence of a catalytic amount of ferric gluconate catalyst. This controlled addition of hydrogen peroxide can be carried out by the incremental addition of a solution of hydrogen peroxide having a concentration of from about 10 percent to about 50 percent by weight to an aqueous solution of calcium gluconate containing the ferric gluconate catalyst. The amount of hydrogen peroxide required for reaction with the calcium gluconate in the process of this invention ranges from about 3.0 moles to about 5.0 moles per mole of calcium gluconate. In a preferred embodiment of the present process, one molar amount of calcium gluconate is reacted with from 3.5 to about 4.5 molar amounts of hydrogen peroxide.

As previously indicated, the present process is carried out in an aqueous medium. Typical starting concentrations of calcium gluconate in this medium can range from about 10 percent to about 25 percent by weight and, preferably, from about 15 percent to about 20 percent by weight.

The present process can be effected over a relatively wide temperature range, such as those ranging from room temperature to up to the boiling point of the mixture. Typically, reaction temperatures ranging from about 25°C to about 80°C are utilized, while temperatures ranging from about 65°C to about 70°C are preferred.

The amount of catalyst which can be effectively utilized in the process of this invention to obtain the high yields of D-arabinose can range from about 1.0 percent to about 5.0 percent by weight, based on the weight of calcium gluconate starting material. A preferred amount of ferric gluconate catalyst, where a maximum utilization of the hydrogen peroxide is realized, ranges from about 1.5 percent to 3.0 percent by weight, based on the weight of calcium gluconate. When a catalyst quantity wihtin this range is utilized in the present process, a maximum conversion of calcium gluconate to D-arabinose is achieved while requiring a minimum amount of hydrogen peroxide to effect this conversion.

Upon completion of the controlled addition of hydrogen peroxide under the conditions heretofore indicated, the D-arabinose can be recovered from the reaction medium by conventional means. For example, the reaction mixture can be first filtered or decanted to remove calcium carbonate which is formed and can then be partially stripped of water by evaporation or distillation under reduced pressure to effect crystallization of the desired product. Other purification steps of the product, such as de-ionization through the use of electrodialysis procedures, can also be used.

The degree and extent of conversion of the calcium gluconate to arabinose and the concentration of arabinose in the reaction mixture can be readily monitored by determining the dextrose equivalent (D.E.) of the reaction mixture.

EXAMPLE I

Preparation of D-Arabinose

Calcium gluconate (40 kg; 93 moles) dissolved in water (125 l) and ferric gluconate (800 gr) were charged into a reaction vessel equipped with stirring and heating means. The reaction mixture was heated to a temperature of about 50°C and a solution of hydrogen peroxide (46 liters at 30 percent concentration; 406 moles) was added with stirring in 20 steps over a period of about 8 hours. After the addition was completed, 26.8 kg of reaction products were obtained containing 57 percent by weight D-arabinose to give a yield of 53 percent of theoretical.

The reaction product was then refined by subjecting it to electrodialysis. This was done by first filtering the reaction mixture to remove insolubles and thereafter cycling the filtrate, having a solids content of 11.4 percent by weight, through a 20 cell electrodialysis stack having a total membrane area of 4,400 square centimeters at 70 volts D.C. for a period of about 2 hours. The electrodialyzed syrup was then concentrated and allowed to stand for a period of about 18 hours to yield 8.5 kg of crystalline D-arabinose as a first crop.

EXAMPLE II

Preparation of D-Arabinose

Calcium gluconate (41 kg; 95.5 moles) dissolved in water at a concentration of 23 percent by weight and ferric gluconate catalyst (700 gr; 1.1 mol) were charged into a reaction vessel equipped with stirring and heating means. The reaction mixture was heated to a temperature of about 65°C and a solution of hydrogen peroxide (395 moles; 28 percent concentration) was added in 16 portions of 2.7 liters each over a period of about 7 hours to yield 28.8 kg of product containing 17 kg of D-arabinose representing a yield of 60 percent of theoretical.

The reaction product was then refined by first removing the insoluble calcium carbonate and thereafter subjecting the clarified liquor to decationization on an ion exchange column to remove calcium ions. The decationized liquor was then concentrated to a solids content of from 65 to 70 percent by weight by heating under reduced pressure. The concentrated liquor was then cooled and allowed to stand, resulting in the formation of 11.4 kg of crystalline D-arabinose having a melting point of 156.5° to 175°C, a density of 1.585 at 20°C and a solubility in water of 59 grams per 100 ml at 10°C.

EXAMPLE III

Preparation of D-Arabinose

Calcium gluconate (40 kg; 43 moles) dissolved in water at a concentration of about 10 percent by weight and ferric gluconate catalyst (400 gr) are charged into a reaction vessel equipped with stirring and heating means. The mixture is then heated to a temperature of about 50°C and aqueous hydrogen peroxide (280 moles; 28 percent concentration) is incrementally added in 20 portions over a period of about 7 hours. After the addition is completed, the reaction mixture is cooled to room temperature and is filtered to remove the calcium carbonate that has formed. The filtrate is concentrated to a solids content of about 65 percent by weight and is allowed to stand to crystallize out the desired D-arabinose.

EXAMPLE IV

Preparation of D-Arabinose

Calcium gluconate (40 kg; 93 moles) dissolved in water at a concentration of about 25 percent by weight and ferric gluconate catalyst (2 kg) are charged into a reaction vessel equipped with stirring and heating means. The reaction mixture is heated to a temperature of about 80°C and aqueous hydrogen peroxide (465 moles; 28 percent concentration) is incrementally added in about 25 portions over a period of 8 hours. After this time, the reaction mixture is cooled to room temperature and is filtered to remove the calcium carbonate which has formed. The filtrate is then subjected to decationization by passing it through an ion exchange column containing a sulfonated polystyrene-type ion exchange resin in the acid cycle. The decationized product is then concentrated to a solids content of about 70 percent by weight and is allowed to stand, resulting in the formation of the desired arabinose in crystalline form.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may fall within the scope of the invention.

I claim:

1. A process for the production of arabinose which comprises reacting calcium gluconate with hydrogen peroxide in the presence of ferric gluconate, said ferric gluconate being present in an amount of from about 1.0 percent to about 5.0 percent based on the weight of the calcium gluconate, the reaction being performed by adding, to a molar amount of calcium gluconate in an aqueous medium, from about 3.0 to about 5.0 molar amounts of hydrogen peroxide, in the presence of said ferric gluconate, said hydrogen peroxide being added in increments.

2. The process of claim 1, wherein the reaction is carried out at a temperature ranging from about 50°C to about 80°C.

3. The process of claim 1, wherein the concentration of the calcium gluconate in the aqueous medium ranges from about 10 percent to about 35 percent by weight.

4. The process of claim 1, wherein the ferric gluconate is present in an amount of from about 1.5 percent to about 3.0 percent by weight based on the weight of calcium gluconate.

* * * * *